United States Patent
Beauvillain et al.

(10) Patent No.: US 11,563,881 B2
(45) Date of Patent: Jan. 24, 2023

(54) ELECTRONIC DEVICE FOR TRANSMITTING A VIDEO STREAM AND ASSOCIATED VEHICLE

(71) Applicants: TRANSDEV GROUP, Issy les Moulineaux (FR); SDEL INFI, Viry-Chatillon (FR)

(72) Inventors: Alexis Beauvillain, Massy (FR); Philippe Thamié, Paris (FR)

(73) Assignees: TRANSDEV GROUP INNOVATION, Issy-les-Moulineaux (FR); SDEL INFI, Viry-Chatillon (FR)

( * ) Notice: Subject to any disclaimer, the term of this patent is extended or adjusted under 35 U.S.C. 154(b) by 317 days.

(21) Appl. No.: 16/849,792

(22) Filed: Apr. 15, 2020

(65) Prior Publication Data

US 2020/0336648 A1   Oct. 22, 2020

(30) Foreign Application Priority Data

Apr. 16, 2019 (FR) ..................... 19 04058

(51) Int. Cl.
*H04J 3/06* (2006.01)
*H04N 5/232* (2006.01)
(Continued)

(52) U.S. Cl.
CPC ....... *H04N 5/23206* (2013.01); *G05D 1/0022* (2013.01); *G05D 1/0246* (2013.01)

(58) Field of Classification Search
CPC .......... H04N 5/23206; H04N 21/4305; G05D 1/0022; G05D 1/0246; H04L 43/106;
(Continued)

(56) References Cited

U.S. PATENT DOCUMENTS

| 6,438,169 B1* | 8/2002 | Takashima ............... H04N 7/52 375/E7.129 |
| 2002/0031120 A1* | 3/2002 | Rakib ................ H04N 21/4786 348/E5.103 |

(Continued)

FOREIGN PATENT DOCUMENTS

| CA | 3077673 A1 * | 10/2020 | ........... G05D 1/0022 |
| EP | 1029273 B1 * | 6/2007 | ............. H04L 12/58 |

(Continued)

OTHER PUBLICATIONS

French Search Report for Application No. 19 04058, dated Oct. 22, 2019 in 2 pages.

(Continued)

*Primary Examiner* — Phuongchau Ba Nguyen
(74) *Attorney, Agent, or Firm* — Knobbe, Martens, Olson & Bear, LLP

(57) ABSTRACT

An electronic device is for transmitting a video stream, and is able to be embedded in an autonomous motor vehicle. The electronic device includes a convertor for converting the video stream into a video signal transmissible via a transmission channel and a transmitter configured to send, to a monitoring device outside the vehicle, via the transmission channel, a signal for escalating information including said video signal. The electronic transmission device also includes a timestamper configured to repeatedly produce a timestamping signal including at least one piece of information relative to the production date of said timestamping signal. The information escalation signal includes the timestamping signal.

13 Claims, 3 Drawing Sheets

(51) Int. Cl.
*G05D 1/00* (2006.01)
*G05D 1/02* (2020.01)

(58) Field of Classification Search
CPC .......... H04L 65/80; H04L 67/12; H04W 4/44; H04J 3/0685; H04J 3/0664; H04J 3/0632; H04J 3/0688
See application file for complete search history.

(56) References Cited

U.S. PATENT DOCUMENTS

| | | | | |
|---|---|---|---|---|
| 2005/0028220 | A1* | 2/2005 | Baer | H04N 5/44504 |
| | | | | 348/E5.002 |
| 2013/0202025 | A1* | 8/2013 | Baron | H04N 21/2385 |
| | | | | 375/240.02 |
| 2013/0336627 | A1* | 12/2013 | Calvert | H04N 9/79 |
| | | | | 386/224 |
| 2015/0195171 | A1 | 7/2015 | Mermoud et al. | |
| 2017/0180800 | A1* | 6/2017 | Mayrand | G06F 3/013 |
| 2017/0332131 | A1* | 11/2017 | Opsenica | H04B 10/116 |
| 2019/0110264 | A1 | 4/2019 | Chung et al. | |
| 2021/0116907 | A1* | 4/2021 | Altman | B60W 50/04 |

FOREIGN PATENT DOCUMENTS

| | | | | |
|---|---|---|---|---|
| EP | 2555533 | A2 * | 2/2013 | ......... H04N 21/2187 |
| RU | 2273111 | C2 * | 3/2006 | ......... G11B 27/3027 |

OTHER PUBLICATIONS

Mate et al., "Efficiency Gain for RoHC Compressor Implementations with Dynamic Configuration", 84 th Vehicular Technology Conference (VTC—Fall), IEEE, Sep. 18, 2016, pp. 1-5.

* cited by examiner

ELECTRONIC DEVICE FOR TRANSMITTING A VIDEO STREAM AND ASSOCIATED VEHICLE

CROSS-REFERENCE TO RELATED APPLICATIONS

This application is a U.S. non-provisional application claiming the benefit of French Application No. 19 04058, filed on Apr. 16, 2019, which is incorporated herein by reference in its entirety.

FIELD OF THE INVENTION

The present invention relates to an electronic device for transmitting a video stream, the electronic transmission device being able to be embedded in an autonomous motor vehicle and comprising a module for converting the video stream into a video signal transmissible via a transmission channel, and a sending module configured to send, to a monitoring device outside the vehicle, via the transmission channel, a signal for escalating information including said video signal.

The invention relates to the field of autonomous motor vehicles, in particular autonomous motor vehicles having a level of automation greater than or equal to 3 on the scale of the "Organisation Internationale des Constructeurs Automobiles" [International Organization of Motor Vehicle Manufacturers in English] (OICA).

In particular, the invention relates to the escalation of a video stream from such an autonomous motor vehicle to an outside monitoring device making it possible to monitor and control this autonomous motor vehicle.

BACKGROUND

Devices for transmitting a video stream of the aforementioned type are known. They make it possible to transmit images filmed by a camera embedded in the vehicle to an operator of the monitoring device, who thus has access to a partial view of the environment of the vehicle controlled by the monitoring device. This is particularly useful in case of obstacle encountered by the vehicle and requiring a remote intervention by the operator to make it possible for the vehicle to bypass the obstacle.

However, there is a delay between the sending of the video stream by the vehicle and the reception of the video stream by the monitoring device due to the lag of the communication network. This transmission delay of the information is problematic for the control of the vehicle when it becomes too great, since there is then a significant time shift between the reality and the perception thereof by the operator.

It is known to display the sending time on the images of the video stream in order to have an estimate of the transmission delay at the monitoring device.

However, such a display does not allow a precise determination of the transmission delay of the video stream and therefore does not make it possible to provide sufficient security for the remote control of the vehicle.

SUMMARY

One aim of the invention is thus to provide an electronic device for transmitting a video stream allowing a precise determination of the lag of the network and making it possible to improve the safety of passengers of the autonomous motor vehicle.

To that end, the invention relates to an electronic device for transmitting a video stream of the aforementioned type, wherein the electronic transmission device also comprises a timestamper configured to repeatedly produce a timestamping signal including at least one piece of information relative to the production date of said timestamping signal, the information escalation signal including said timestamping signal.

According to specific embodiments of the invention, the electronic transmission device also has one or more of the following features, considered alone or according to any technically possible combination(s):

a sending module (transmitter) comprises a multiplexer configured to receive the video signal and the timestamping signal and to produce a multiplexed signal incorporating the video signal and the timestamping signal, said multiplexed signal constituting the information escalation signal;

the sending module is able to communicate with the outside monitoring device according to the RTP protocol;

a convertor is configured to incorporate empty images into the video signal, in a manner synchronized with the production of the timestamping signal; and the electronic sending device comprises a collector configured to collect information able to collect at least one additional piece of information relative to the vehicle and producing a collected data signal representative of the or each additional piece of information, the information escalation signal including said collected data signal.

The invention also relates to an autonomous motor vehicle comprising an electronic device for transmitting a data stream as defined above and at least one camera coupled to the conversion module and able to generate the video stream.

The invention also relates to a system for monitoring at least one autonomous motor vehicle, the monitoring system comprising at least one autonomous motor vehicle as defined above; an electronic monitoring device configured to receive the information escalation signal from the electronic transmission device of the or each autonomous motor vehicle, the electronic monitoring device comprising a displa configured to recover the video stream from the information escalation signal and to display said video stream on at least one screen.

According to specific embodiments of the invention, the monitoring system also comprises one or more of the following features, considered alone or according to any technically possible combination(s):

a calculator configured to calculate the transmission time of the timestamping signal between the timestamping module and the calculating module;

the calculator is further configured to communicate, to the display, the transmission time of the timestamping signal, the display being configured to display said transmission time on the screen; and the monitoring system comprises a demultiplexer configured to receive the information escalation signal, demultiplex said information escalation signal to extract the timestamping signal and the video signal therefrom, and transmit the timestamping signal to the calculator and the video signal to the display.

The invention also relates to a method for transmitting a video stream, comprising the following steps:
- converting the video stream into a video signal transmissible via a transmission channel,
- repeatedly producing a timestamping signal including at least one piece of information relative to the production date of said timestamping signal, and
- sending, via the transmission signal, an information escalation signal including said video signal and said timestamping signal.

According to specific embodiments of the invention, the transmission method also has one or more of the following features, considered alone or according to any technically possible combination(s):
- the conversion of the video stream into a video signal comprises the integration of empty images into the video signal, synchronously with the production of the timestamping signal;
- the video stream is produced by a camera embedded in an autonomous motor vehicle, the information escalation signal being sent to a monitoring device outside said autonomous motor vehicle; and
- the conversion, production and sending steps are carried out on board the autonomous motor vehicle.

The invention also relates to a non-transitory computer-readable medium including a computer program including software instructions which, when executed by a computer, implement a transmission method as defined above.

BRIEF DESCRIPTION OF THE DRAWINGS

The invention will be better understood using the following description, provided solely as an example and done in reference to the appended figures, in which.

DETAILED DESCRIPTION

Figure 1:
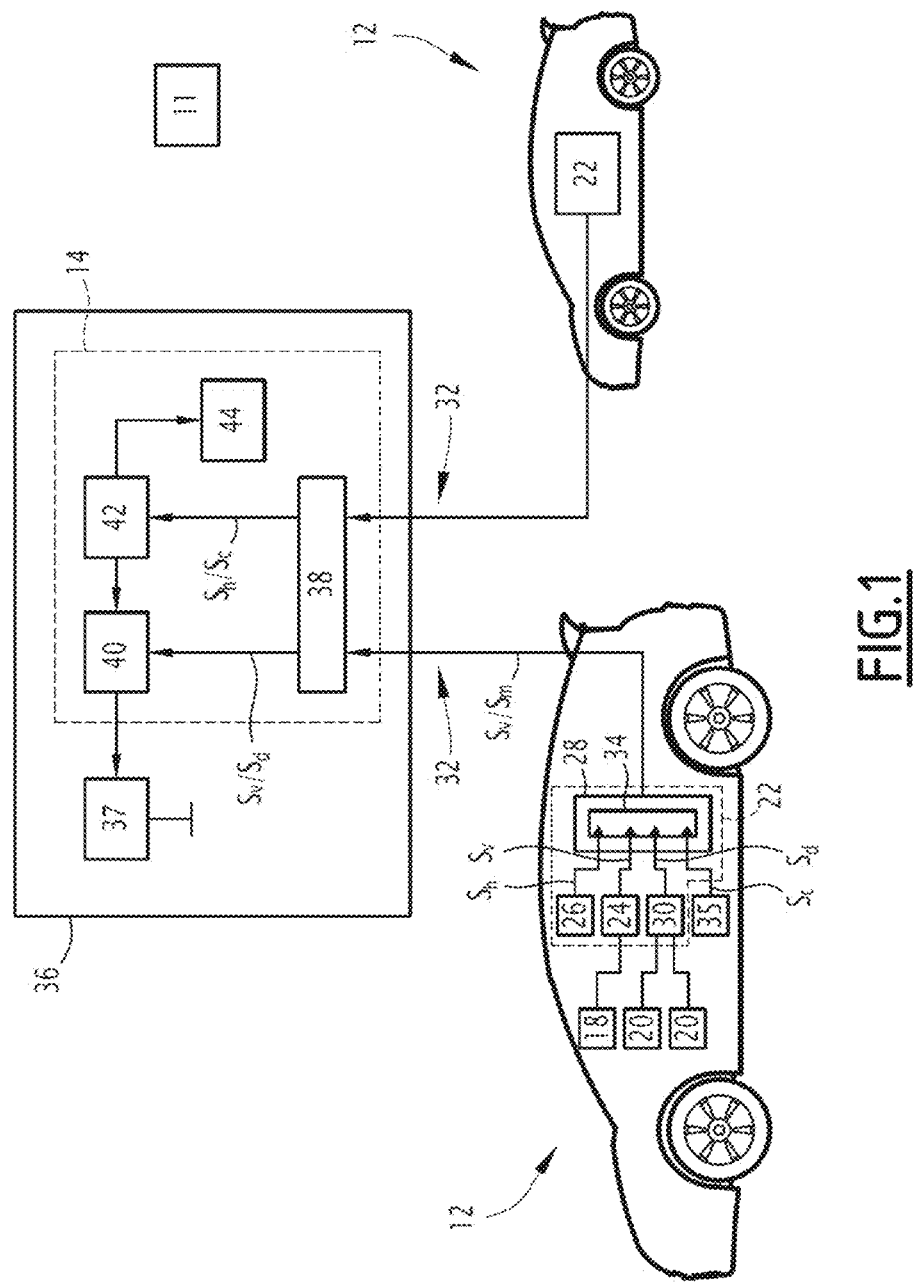
FIG. 1 is a schematic view of a monitoring system comprising an autonomous motor vehicle according to the invention and a monitoring device outside the vehicle.

A monitoring system 10 is shown in FIG. 1.

The monitoring system 10 comprises a reference server 11, a fleet of at least one vehicle 12, and an electronic monitoring device 14.

The monitoring system 10 is able to monitor and control each vehicle 12.

The reference server 11 is able to supply a reference time for all of the computer systems of a network coupled to the reference server 11 and allowing all of these systems to synchronize their local clock with the reference time.

To that end, the reference server 11 advantageously implements the NTP protocol (Network Time Protocol).

The NTP protocol makes it possible to synchronize the local clock of the systems of the network with that of the reference server 11.

The NTP protocol, which is well known by those skilled in the art, is for example defined by the RFC 1305 for version 3 of the NTP protocol or by the RFC 5905 for version 4 of the NTP protocol.

Each vehicle 12 is for example a motor vehicle, in particular a bus or coach bus, configured to move on a road.

The vehicle 12 comprises, in a known manner, rear wheels, front wheels, a motor mechanically connected via a transmission chain to the rear and/or front wheels for the driving of said wheels in rotation around their axis, a steering system, suitable for acting on the front and/or rear wheels of the vehicle 12 so as to modify the orientation of its trajectory, and a braking system, suitable for exerting a braking force on the wheels of the vehicle 12.

The vehicle 12 is typically made up of a traction and/or electric propulsion vehicle. To that end, the motor is made up of an electric motor, and the vehicle 12 comprises an electric battery electrically connected to the motor to supply the motor with electricity.

The vehicle 12 is an autonomous motor vehicle. To that end, the vehicle comprises at least one camera 18 able to produce a video stream and advantageously additional sensors 20. Each sensor 20 is for example an infrared camera, a radar, a LIDAR, a temperature sensor, a pressure sensor and/or a humidity sensor.

The vehicle 12 further comprises an electronic autonomous driving device suitable for piloting the vehicle 12 autonomously by receiving information on the environment of the vehicle 12 by means of the camera 18 and sensors 20 and by acting on the motor, the steering system and the braking system, so as to modify the speed, the acceleration and the trajectory of the vehicle 12 in response to the received information.

The autonomous vehicle 12 preferably has a level of automation greater than or equal to 3 on the scale of the "*Organisation Internationale des Constructeurs Automobiles*" [International Organization of Motor Vehicle Manufacturers in English] (OICA). The level of automation is then equal to 3, that is to say, a conditional automation, or equal to 4, that is to say, a high automation, or equal to 5, that is to say, a full automation.

According to the OICA scale, level 3 for conditional automation corresponds to a level for which the driver does not need to perform continuous monitoring of the driving environment, while still having to be able to take back control of the autonomous motor vehicle 12. According to this level 3, a system for managing the autonomous driving, embedded in the autonomous motor vehicle 12, then performs the longitudinal and lateral driving in a defined usage case and is capable of recognizing its performance limits to then ask the driver to take back dynamic driving with a sufficient time margin.

The high level of automation 4 then corresponds to a level for which the driver is not required in a defined usage case. According to this level 4, the system for managing the autonomous driving, embedded in the autonomous motor vehicle 12, then performs the dynamic longitudinal and lateral driving in all situations in this defined usage case.

The full automation level 5 lastly corresponds to a level for which the system for managing the autonomous driving, embedded in the autonomous motor vehicle 12, performs the dynamic lateral and longitudinal driving in all situations encountered by the autonomous motor vehicle 12, throughout its entire journey. No driver is then required. As illustrated in FIG. 1, each vehicle 12 comprises an electronic communication device 22.

The communication device 22 comprises a conversion module 24, a timestamping module 26 and a transmission module 28.

Each communication device 22 further advantageously comprises an information collection module 30.

The conversion module 24 is able to convert the video stream produced by the camera 18 into a video signal Sv transmissible via a transmission channel 32.

The transmission channel 32 couples the vehicle 12 and the monitoring device 14.

The transmission channel 32 is preferably made up of a communication network using the Internet protocol. This network typically includes wireless communication channels.

The video signal Sv is then advantageously made up of a plurality of computer data packets.

The packets are able to be sent separately. The packets are digitized so as to be able to reconstitute the original video stream.

Each packet comprises a body and a header. The body comprises the data relative to the video stream. The header comprises different additional information making it possible to identify the packet such as the packet number, this size of the packet, the origin of the packet, the content type of the packet, etc.

The conversion module 24 is advantageously able to implement an RTP protocol
(Real-Time Transport Protocol).

The RTP protocol is a computer communication protocol allowing the transport of data subject to real-time constraints, such as audio or video streams. In particular, the RTP protocol describes the standard packet format of the audio or video transmission.

The RTP protocol, well known by those skilled in the art, is for example defined in RFC (Request For Comments) 3550.

The conversion module 24 is further advantageously configured to integrate empty images into the video signal Sv.

An empty image in particular corresponds to a packet comprising an empty body, without any data relative to the video stream. The data volume of the packet is then very small.

The timestamping module 26 is configured to produce repeatedly, advantageously periodically, a timestamping signal Sh including at least one piece of information relative to the production date of said timestamping signal Sh.

Advantageously, the conversion module 24 is configured to incorporate empty images into the video signal Sv, in a manner synchronized with the production of the timestamping signal Sh.

The timestamping module 26 is advantageously connected to the reference server 11, such that the clock of the module 26 is synchronized with the reference time.

The sending module 28 is configured to send the monitoring device 14, via the transmission channel 32, an information escalation signal Sr.

The information escalation signal Sr includes the video signal Sv and the timestamping signal Sh.

In one advantageous embodiment, the sending module 28 comprises a multiplexer 34.

The multiplexer 34 is configured to receive the video signal Sv and the timestamping signal Sh. The multiplexer 34 is further configured to produce a multiplexed signal Sm integrating the video signal Sv and the timestamping signal Sh. The multiplexed signal Sm then constitutes the information escalation signal Sr.

Advantageously, the multiplexer 34 is able to incorporate, into the header of the packets relative to the empty images produced by the conversion module 24, the information relative to the production date contained in the timestamping signal Sh.

The multiplexed signal Sm is then made up of packets whose body comprises the data relative to the video stream and packets with empty bodies whose header comprises the timestamping information.

In one advantageous embodiment, the sending module 28 is able to communicate with the outside monitoring device 14 according to the RTP protocol.

The information collection module 30 is able to collect at least one additional piece of information relative to the vehicle 12. The at least one additional piece of information is advantageously produced by the sensors 20 embedded in the vehicle 14.

For example, each piece of information is a piece of information relative to the speed of the vehicle 14, the charge state of the battery, an outside temperature, an outside pressure or an outside humidity.

The information collection module 30 is further able to produce a collected data signal Sd relative to the or each additional piece of information.

The multiplexer 34 is also configured to receive the collected data signal Sd. The information escalation signal Sr thus includes the collected data signal Sd.

Advantageously, the multiplexer 34 is able to incorporate, into the header of the packets relative to the empty images produced by the conversion module 24, the additional piece(s) of information contained in the collected data signal Sd. Optionally, the multiplexer 34 is also able to incorporate these additional pieces of information into the header of packets whose body comprises data relative to the video stream.

In one advantageous embodiment, the multiplexer 34 is further able to receive an additional signal Sc. The complementary signal Sc is produced by a LIDAR 35 embedded in the vehicle 14. The complementary signal Sc is timestamped and thus comprises a piece of information relative to the production date of said complementary signal Sc. The information escalation signal Sr then includes the complementary signal Sc.

The conversion module 24, the timestamping module 26, the sending module 28 and the information collection module 30 are typically made in the form of software stored in a memory (not shown) and able to be executed by a processor (not shown) associated with said memory, the memory and the processor together forming an information processing unit included in the electronic communication device 22. In a variant, the conversion module 24, the timestamping module 26, the sending module 28 and the information collection module 30 are made in the form of a programmable logic component or in the form of a dedicated integrated circuit included in the electronic communication device 22.

The monitoring device 14 is positioned in a remote control station 36. The control station 36 is located at a distance from the vehicles 12 and ensures the control of the vehicle 12 by an operator using at least one screen 37 positioned in the control station 36.

In reference to FIG. 1, the monitoring device 14 advantageously comprises a demultiplexer 38, a display module 40 and a calculating module 42.

The demultiplexer 38 is configured to receive the information escalation signal Sr.

The demultiplexer 38 is configured to demultiplex the information escalation signal Sr and to extract the timestamping signal Sh and the video signal Sv therefrom, and advantageously the collected data signal Sd and the complementary signal Sc.

In particular, the demultiplexer 38 is able to separate the packets whose body comprises the data relative to the video stream in order to obtain the video signal Sv and the packets with empty bodies and whose header comprises the timestamping information in order to obtain the timestamping signal Sh.

When the information escalation signal Sr comprises the collected data signal Sd and the complementary signal Sc, the demultiplexer 38 is able to separate the packets associated with each signal from identification information present in the header of each packet.

The demultiplexer 38 is configured to transmit the video signal Sv to the display module 40 and the timestamping signal Sh to the calculating module 42.

The demultiplexer 38 is further configured to transmit the collected data signal Sd to the display module 40 and the complementary signal Sc to the calculating module 42.

The display module 40 is configured to recover the video stream from the information escalation signal Sr and in particular from the video signal Sv.

The display module 40 is configured to display the video stream on at least one of the screens 37. The operator thus has access to the images supplied by the camera 18 embedded in the vehicle 14.

The display module 40 is further configured to display the additional information comprised in the collected data signal Sd on the screen 37. The operator then has access to this additional information.

The calculating module 42 is configured to calculate the transmission time of the timestamping signal Sv between the timestamping module 26 and the calculating module 42.

In particular, the timestamping module 42 is advantageously connected to the reference server 11, such that the clock of the module 42 is itself also synchronized with the reference time.

The calculating module 42 is thus able to determine the transmission time of the timestamping signal Sv by difference between the production time of the timestamping signal Sh by the timestamping module 26 and the reception time of the timestamping signal Sh by the calculating module 42.

The determination of the transmission time of the timestamping signal Sv thus makes it possible to calculate the lag of the transmission channel 32.

When the information escalation signal Sr comprises the additional signal Sc, the calculation module 42 is configured to calculate the transmission time of the additional signal Sc between the LIDAR 35 having generated the additional signal Sc and the calculating module 42.

The calculating module 42 is further configured to communicate, to the display module 40, the transmission time of the timestamping signal Sh, and advantageously the transmission time of the additional signal Sc.

In a variant, the calculating module 42 is configured to communicate, to the display module 40, the maximum between the transmission time of the timestamping signal Sh, and the transmission time [of the] additional signal Sc.

The display module 40 is then configured to display the transmission time(s) on the screen 37. The operator thus knows a precise estimate of the lag of the transmission channel 32 and knows the delay of the images he is viewing on the screen 37 relative to the reality.

The calculating module 42 is further configured to send the transmission time(s) to a memory 44 storing the transmission time over time.

Optionally or in a variant, the calculating module 42 is configured to send the transmission time(s) to at least one logic controller (not shown) for automatic processing of this or these transmission time(s).

The display module 40 and the calculating module 42 are typically made in the form of software stored in a memory (not shown) and able to be executed by a processor (not shown) associated with said memory, the memory and the processor together forming an information processing unit included in the monitoring device 14. In a variant, the display module 40 and the calculating module 42 are made in the form of a programmable logic component or in the form of a dedicated integrated circuit included in the monitoring device 14.

A method for determining a network lag, carried out by the monitoring system 10, is made up of a first method 100 for transmitting a video stream by one of the vehicles 12 followed by a method 200 for monitoring of the vehicle 12.

Figure 2:
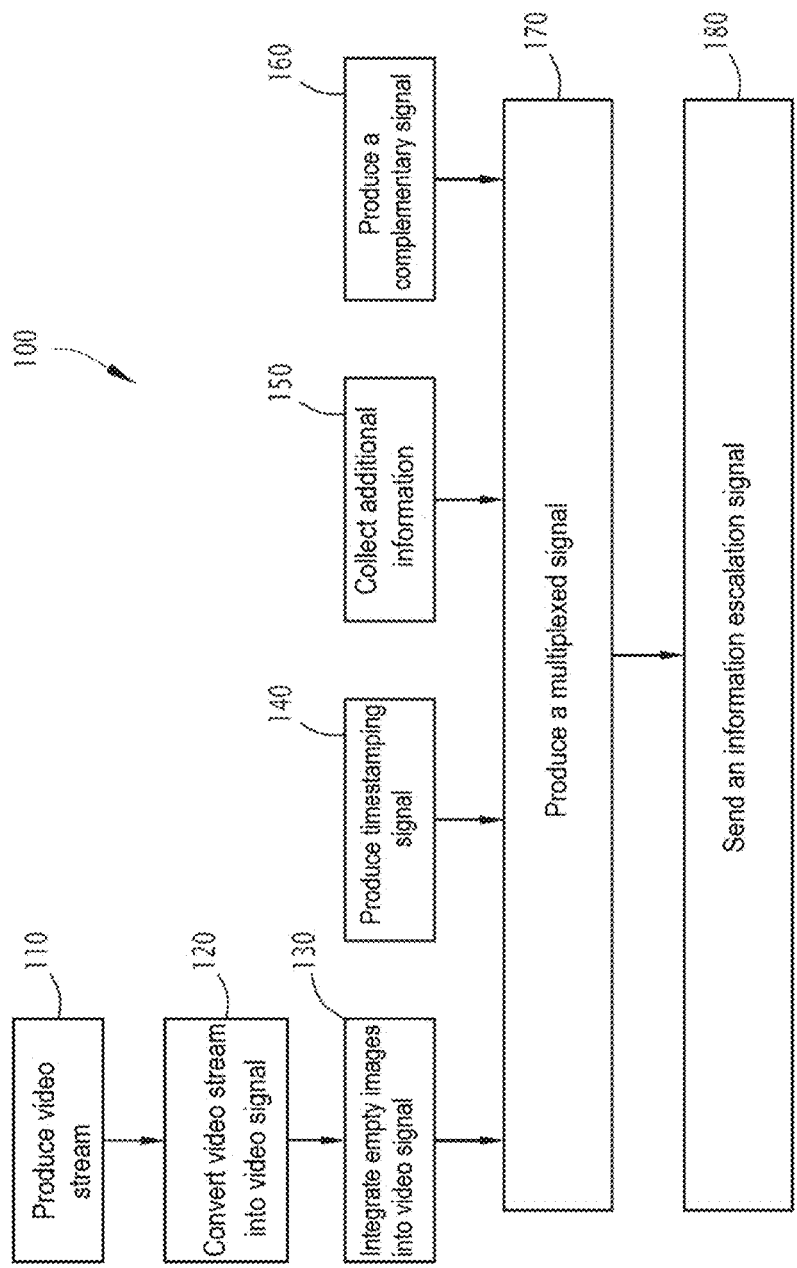
FIG. 2 is a block diagram illustrating a transmission method implemented by an electronic transmission device of the monitoring system of FIG. 1.

The method 100 for transmitting a video stream, carried out by the electronic transmission device 22, will now be described, in reference to FIG. 2.

This method 100 comprises a first step 110 for producing a video stream via the camera 18 embedded in the autonomous motor vehicle 12.

Step 110 is followed by a step 120 for converting the video stream into a video signal Sv transmissible via a transmission channel 32.

Step 120 is in turn followed by an optional step 130 for integrating empty images into the video signal Sv.

The method 100 comprises a step 140 for repeatedly producing a timestamping signal Sh including at least one piece of information relative to the production date of the timestamping signal Sh.

Step 140 is performed in parallel with steps 110, 120 and 130.

Advantageously, the integration of the empty images is done synchronously with the production of the timestamping signal Sh.

The method 100 further comprises an optional step 150 for collecting at least one additional piece of information relative to the vehicle 12 and producing a collected data signal Sd representative of the or each additional piece of information. Step 150 is performed in parallel with steps 110 to 140.

The method 100 further comprises an optional step 160 for producing a timestamped complementary signal Sc produced by a LIDAR 35 embedded in the vehicle 12. Step 160 is performed in parallel with steps 110 to 150.

The method 100 comprises, after steps 130 to 160, an optional step 170 for producing a multiplexed signal incorporating the video signal Sv and the timestamped signal Sh, and optionally the collected data signal Sd and the complementary signal Sc.

Step 170 is in turn followed by a step 180 for sending, via the transmission channel 32, an information escalation signal Sr including the video signal Sv and the timestamping signal Sh, and optionally the collected data signal Sd and the complementary signal Sc. When step 170 is carried out, the multiplexed signal Sm constitutes the information escalation signal Sr.

The information escalation signal Sr is sent to the monitoring device 14 outside the autonomous motor vehicle 12.

Steps 110 to 180 are carried out on board the autonomous motor vehicle 12.

Figure 3:
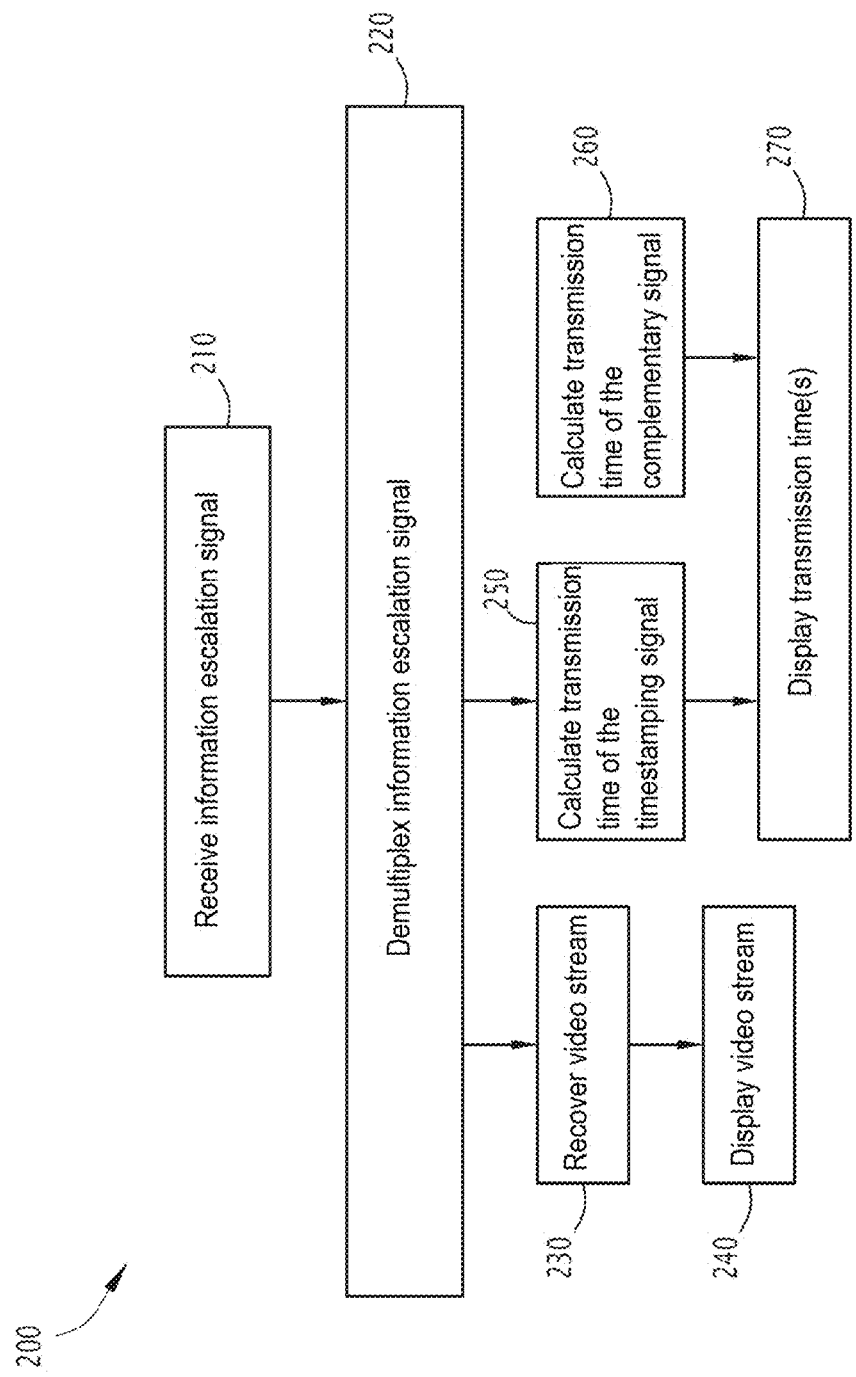
FIG. 3 is a block diagram illustrating a monitoring method implemented by a monitoring device of the monitoring system of FIG. 1.

The method 200 for monitoring one of the vehicles 12, carried out by the electronic monitoring device 14, will now be described in reference to FIG. 3.

This method 200 comprises a first step 210 for receiving the information escalation signal Sr sent by the transmission device 22.

When the information escalation signal Sr is in the form of a multiplexed signal Sm, step 210 is in turn followed by a step 220 for demultiplexing the multiplexed signal Sm to extract the timestamping signal Sh and the video signal Sv therefrom, as well as optionally the collected data signal Sd and the complementary signal Sc.

The method 200 next comprises a step 230 for recovering the video stream from the video signal Sv, then a step 240 for displaying the video stream on at least one of the screens 15.

The method 200 comprises a step 250 for calculating the transmission time of the timestamping signal Sh between its production by the transmission device 22 and its reception by the electronic monitoring device 14. Step 250 is performed in parallel with steps 230 and 240.

The method 200 comprises an optional step 260 for calculating the transmission time of the complementary signal Sc between its production and its reception by the electronic monitoring device 14. Step 260 is performed in parallel with steps 230, 240 and 250.

Steps 250 and 260 are followed by a step 270 for displaying, on the screen 37, the transmission time of the timestamping signal Sh and optionally the complementary signal Sc or the maximum between the two times.

Owing to the invention described above, a precise determination of the lag of the network is possible and allows the operator to determine the delay of the images he is viewing on the screen 37 relative to the reality of the environment of the car 12 to be controlled by the operator. The invention therefore makes it possible to have precise and reliable information on the saturation state of the network and makes it possible to detect a damaged network. The operator then acts accordingly in order to guarantee the safety of the passengers of the autonomous motor vehicle 12.

The invention further makes it possible to calculate the empty lag, corresponding to the lag due solely to the transmission channel 32, this calculation not being possible with the devices known from the state of the art. It is thus possible to use this knowledge of the empty lag advantageously to monitor vehicles in the fleet.

What is claimed is:

1. An electronic device for transmitting a video stream, the electronic transmission device being able to be embedded in an autonomous motor vehicle and comprising:
   a converter for converting said video stream into a video signal transmissible via a transmission channel, and
   a transmitter configured to send, to a monitoring device outside the vehicle, via the transmission channel, a signal for escalating information including said video signal;
   wherein the electronic transmission device also comprises a timestamper configured to repeatedly produce a timestamping signal including at least one piece of information relative to a production date of said timestamping signal, said information escalation signal including said timestamping signal,
   wherein the converter is configured to incorporate empty images into the video signal, in a manner synchronized with the production of said timestamping signal.

2. The electronic transmission device according to claim 1, wherein the transmitter comprises a multiplexer configured to receive said video signal and said timestamping signal and to produce a multiplexed signal incorporating the video signal and the timestamping signal, said multiplexed signal constituting an information escalation signal.

3. The electronic transmission device according to claim 1, wherein the transmitter is able to communicate with said outside monitoring device according to a Real-Time Transport Protocol (RTP protocol).

4. The electronic transmission device according to claim 1, comprising a collecter able to collect at least one additional piece of information relative to the vehicle and producing a collected data signal representative of said additional piece of information, said information escalation signal including said collected data signal.

5. An autonomous motor vehicle comprising:
   said electronic transmission device for transmitting a video stream according to claim 1; and
   at least one camera coupled to the converter and able to generate said video stream.

6. A monitoring system for monitoring at least one autonomous motor vehicle, the system comprising:
   at least one autonomous motor vehicle according to claim 5; and
   an electronic monitor configured to receive said information escalation signal from the electronic transmission device of said autonomous motor vehicle, the electronic monitoring device comprising a display configured to recover the video stream from said information escalation signal and to display said video stream on at least one screen.

7. The monitoring system according to claim 6, wherein the electronic monitoring device comprises a calculator configured to calculate a transmission time of said timestamping signal between the timestamper and the calculator.

8. The monitoring system according to claim 7, wherein the calculator is further configured to communicate, to the display, said transmission time of said timestamping signal, the display being configured to display said transmission time on the screen.

9. The monitoring system according to claim 6, wherein the transmitter comprises a multiplexer configured to receive the video signal and the timestamping signal and to produce a multiplexed signal incorporating said video signal and said timestamping signal, said multiplexed signal constituting an information escalation signal, and the electronic monitoring device comprises a demultiplexer configured to receive said information escalation signal, demultiplex said information escalation signal to extract said timestamping signal and said video signal therefrom, and transmit said timestamping signal to the calculator and said video signal to the display.

10. A method for transmitting a video stream, comprising:
    converting the video stream into a video signal transmissible via a transmission channel,
    repeatedly producing a timestamping signal including at least one piece of information relative to the production date of said timestamping signal, and
    sending, via the transmission signal, an information escalation signal including said video signal and said timestamping signal,
    wherein the conversion of the video stream into said video signal comprises the integration of empty images into said video signal, synchronously with the production of said timestamping signal.

11. The transmission method according to claim 10, wherein said video stream is produced by a camera embedded in an autonomous motor vehicle, said information escalation signal being sent to a monitoring device outside said autonomous motor vehicle.

12. The transmission method according to claim 11, wherein the conversion, production and sending are carried out on board the autonomous motor vehicle.

13. A non-transitory computer-readable medium including a computer program comprising software instructions which, when executed by a computer, carry out a transmission method according to claim 10.

\* \* \* \* \*